(12) United States Patent
Zhu et al.

(10) Patent No.: US 7,920,579 B2
(45) Date of Patent: Apr. 5, 2011

(54) METHOD, SYSTEM AND APPARATUS FOR MEDIA GATEWAY TO TRANSMIT AND RECEIVE MULTICAST DATA

(75) Inventors: Ning Zhu, Shenzhen (CN); Weiwei Yang, Shenzhen (CN)

(73) Assignee: Huawei Technologies Co., Shenzhen (CN)

( * ) Notice: Subject to any disclaimer, the term of this patent is extended or adjusted under 35 U.S.C. 154(b) by 28 days.

(21) Appl. No.: 12/413,015

(22) Filed: Mar. 27, 2009

(65) Prior Publication Data

US 2009/0185563 A1 Jul. 23, 2009

Related U.S. Application Data

(63) Continuation of application No. PCT/CN2007/002867, filed on Sep. 29, 2007.

(30) Foreign Application Priority Data

Sep. 30, 2006 (CN) .......................... 2006 1 0140147

(51) Int. Cl.
*H04L 12/28* (2006.01)
(52) U.S. Cl. ....................................... 370/401; 709/228
(58) Field of Classification Search .................. 370/391, 370/401; 709/227–229
See application file for complete search history.

(56) References Cited

U.S. PATENT DOCUMENTS

| | | | |
|---|---|---|---|
| 6,741,585 B1 * | 5/2004 | Munoz et al. ................. | 370/352 |
| 6,996,414 B2 | 2/2006 | Vishwanathan et al. | |
| 2003/0231639 A1 | 12/2003 | Mikkola | |
| 2003/0235184 A1 | 12/2003 | Dorenbosch et al. | |
| 2005/0105495 A1 | 5/2005 | Hollis et al. | |
| 2005/0117576 A1 * | 6/2005 | McDysan et al. ............. | 370/389 |
| 2006/0077989 A1 | 4/2006 | Lu et al. | |
| 2007/0086458 A1 * | 4/2007 | Narayanan et al. ........... | 370/390 |
| 2008/0298309 A1 * | 12/2008 | DePietro et al. .............. | 370/328 |
| 2009/0161593 A1 * | 6/2009 | Godor et al. .................. | 370/312 |

FOREIGN PATENT DOCUMENTS

CN 1545303 A 11/2004

(Continued)

OTHER PUBLICATIONS

European Search Report for Application No. 07816481.1, dated Nov. 2, 2009, 10 pages.

(Continued)

*Primary Examiner* — Ayaz R Sheikh
*Assistant Examiner* — Mounir Moutaouakil
(74) *Attorney, Agent, or Firm* — Finnegan, Henderson, Farabow, Garrett & Dunner LLP

(57) ABSTRACT

The present invention provides a method, system and apparatus for an MG to transmit and receive multicast data. A method for an MG to receive multicast data in embodiments of the present invention include the following: the MG receives a multicast-related indication from the MGC, reports the relevant information to the router in the network at the multicast source side according to the indication, and requests to join the multicast group. The MG receives the multicast data transmitted by the multicast source. A method for an MG to transmit multicast data in embodiments of the present invention include the following: the MG receives the multicast-related indication from the MGC; and the MG transmits the corresponding multicast data to the users in the network at the receiver side in the form of multicast according to the indication.

13 Claims, 6 Drawing Sheets

FOREIGN PATENT DOCUMENTS

| | | |
|---|---|---|
| CN | 1567775 A | 1/2005 |
| CN | 1832517 A | 9/2006 |
| CN | 1855897 A | 11/2006 |

OTHER PUBLICATIONS

English Translation of Specification of CN1567775A, dated Jan. 19, 2005.

Chinese Office Action dated, Jul. 24, 2009, issued in related Chinese Application No. 200610140147.6, with English Translation.

Wanjiun Liao et al., Application-Layer Conference Trees for Multimedia Multipoint Conference Using Megaco/H.248, IEEE Transactions on Multimedia, Oct. 2005, vol. 7, No. 5, 10 pages.

International Search Report from P.R. China in International Application No. PCT/CN2007/002867 mailed Dec. 27, 2007.

Written Opinion of the International Searching Authority (translation) dated (mailed) Dec. 27, 2007, issued in related application No. PCT/CN2007/002867, filed Sep. 29, 2007, Huawei Technologies Co., Ltd.

European Office Action dated (mailed) May 21, 2010, issued in related European application No. 07816481.1, Huawei Technologies Co., Ltd.

Series H: Audiovisual and Multimedia Systems—Infrastructure of audiovisual services—Communication procedures; Gateway control protocol: Version 2, Corrigendum 1, ITU-T Recommendation H.248.1 v2, International Telecommunication Union, Mar. 2004, 44 pages.

Series H: Audiovisual and Multimedia Systems—Infrastructure of audiovisual services—Communication procedures; Gateway control protocol: Version 3, ITU-T Recommendation H.248.1, International Telecommunication Union, Sep. 2005, 206 pages.

Arango, M. et al., "Media Gateway Control Protocol (MGCP) Version 1.0", Request for Comments 2705, Network Working Group, The Internet Society (Oct. 1999), 120 pages.

Cain, B. et al., "Internet Group Management Protocol Version 3", Request for Comments 3376, Network Working Group, The Internet Society (Oct. 2002), 48 pages.

Groves, C. et al., "Gateway Control Protocol Version 1", Request for Comments 3525, Network Working Group, The Internet Society (Jun. 2003), 190 pages.

\* cited by examiner

US 7,920,579 B2

METHOD, SYSTEM AND APPARATUS FOR MEDIA GATEWAY TO TRANSMIT AND RECEIVE MULTICAST DATA

This application is a continuation of international application number PCT/CN2007/002867, filed on Sep. 29, 2007, and claims the benefit of priority from the Chinese Patent Application No. 200610140147.6, filed with the Chinese Patent Office on Sep. 30, 2006, entitled METHOD, SYSTEM AND APPARATUS FOR MEDIA GATEWAY TO TRANSMIT AND RECEIVE MULTICAST DATA, both of which are incorporated herein by reference in their entirety.

TECHNICAL FIELD

Embodiments disclosed herein relate to the field of communication, and in particular, to a method, system, and apparatus for a Media Gateway (MG) to transmit and receive multicast data.

BACKGROUND

As shown in FIG. 1, two key components exist in a packet-switched network: Media Gateway Controller (MGC) and Media Gateway (MG). The MGC is responsible for the call control function, and the MG is responsible for the service bearer function. In this way, the call control plane is separated from the service bearer plane, the network resources are sufficiently shared, equipment upgrade and service extension are simplified, and the development and maintenance costs are reduced.

The (media) gateway control protocol is a protocol mainly used for communication between the MG and the MGC. The currently prevalent (media) gateway control protocols include H.284/Gateway Control Protocol (MeGaCo) and Media Gateway Control Protocol (MGCP). The MGCP R1 protocol was formulated by the Internet Engineering Task Force (IETF) in October 1999 and revised in January 2003. The H.248/MeGaCo R1 protocol was formulated by the IETF and the International Telecommunications Union (ITU) in November 2000 and revised in June 2003. The H.248 R2 protocol was formulated by the ITU in May 2002 and revised in March 2004. The H.248 R3 protocol was formulated by ITU in September 2005.

Taking the H.248 protocol as an example, various resources on the MG are abstractly represented by terminals. Terminals are categorized into physical terminals and ephemeral terminals. Physical terminals are physical entities which exist semi-permanently, for example, Time Division Multiplex (TDM) channels. Ephemeral terminals represent the public resources which are requested temporarily and released soon after being used, for example, Real-time Transport Protocol (RTP) streams. Moreover, a root terminal is used to represent the entirety of the MG. The combinations among terminals are abstractly represented by contexts. A context may include multiple terminals. Therefore, topology is used to describe the interrelations between terminals. The terminal not related to other terminals is contained by a special context called "null".

Based on an abstract model, such as the foregoing protocol, the call routing is actually an operation on the terminal and the context. Such operations are performed through Command Requests and Reply between the MGC and the MG Command types include: Add, Modify, Subtract, Move, AuditValue, AuditCapabilities, Notify, and ServiceChange. Command parameters, also known as descriptors, are categorized into Property, Signal, Event, and Statistic. The parameters with service relevance are logically aggregated into a package.

Taking the IP multicast technology of sending services to type-D IP address (namely, multicast address) as an example, when the IP multicast technology enables the sender to send the same service content to one or more receivers, only one copy of the same content needs to be sent to the specified multicast address, thus reducing the load on the service sender and increasing the transport network efficiently.

In order to obtain the multicast contents, the content receiver (namely, the user) joins a service multicast group, for example, by using the Internet Group Message Protocol (IGMP), to require the adjacent router to send service contents to the content receiver. Routers interact with each other through a multicast routing protocol, for example, Protocol Independent Multicast-Sparse Mode (PIM-SM) protocol, to create a multicast forwarding path. In this way, the multicast service contents can be sent to the content receiver from the multicast source along the multicast forwarding path.

When a service stream is transferred through the multicast technology, the service sender needs to send only one service stream regardless of the number of receivers. Only one data stream is generated along the transmission path from sending point of the multicast data to the transfer point of the receiver. Accordingly, the multicast technology reduces the load of the service sender (service provider), and makes better use of network resources.

In the propagation path of the current multicast content, the entity for receiving and forwarding the multicast service is a router. When different networks are interconnected, an MG is usually required. However, the action of an MG is not identical to the action of a router. First, the MG is unable to receive multicast routing messages such as PIM-SM, and hence the multicast data is unable to pass through the MG. The H.248 protocol is increasingly becoming a mainstream protocol for bearer control, and needs to support multicast media and signaling forwarding.

SUMMARY

The disclosed embodiments provide a method, system and apparatus for an MG to transmit and receive multicast data.

A method for an MG to receive multicast data consistent with the disclosed embodiments may include: the MG receives a multicast-related indication from the MGC, and reports the relevant information to the router in the network at the multicast source side according to the indication, and requests to join the multicast group; the MG receives the multicast data transmitted by the multicast source.

A method for an MG to transmit multicast data according to a disclosed embodiment includes the following:

the MG receives the multicast-related indication from the MGC; and the MG transmits the corresponding multicast data to the users in the network at the receiver side in the form of multicast according to the indication.

A system for an MG to receive multicast data according to a disclosed embodiment includes:

an MGC, which includes a sending unit adapted to send a multicast-related indication to an MG when receiving a request of joining or quitting the multicast group from the user; and the MG, which includes a receiving unit adapted to report the relevant information to the router in the network at the multicast source side according to the indication of the MGC, request to join the multicast group, and receive the multicast data.

A system for an MG to transmit multicast data according to a disclosed embodiment includes: an MGC, which includes:
a sending unit, adapted to send a data-related indication to the MG in the form of multicast; and
an MG, which includes a transmitting unit adapted to transmit the specified data to the user in the form of multicast according to the indication of the MGC.

An MGC according to a disclosed embodiment includes a sending unit, adapted to send a multicast-related indication to the MG when receiving a request of joining or quitting the multicast group from the user.

An MG according to a disclosed embodiment includes a receiving unit, adapted to report relevant information to the router in the network at the multicast source side according to the indication of the MGC, request to join the multicast group, and receive the multicast data.

Another MGC according to a disclosed embodiment includes a sending unit, adapted to send to the MG a relevant indication of transmitting data in the form of multicast.

Another MG according to a disclosed embodiment includes a transmitting unit, adapted to transmit the specified data to the user in the form of multicast according to the indication of the MGC.

A method, system and apparatus for an MG to receive multicast data are provided in a disclosed embodiment, where the MGC sends a multicast-related indication to the MG. Afterward, the MG reports multicast memberships to the router in the network at the multicast source side according to the indication of the MGC. Accordingly, the MG joins or quits the multicast group as a user, and receives multicast data. The indication includes several contents extended in a disclosed embodiment in order to enable the MG to receive multicast data.

A method and a system for an MG to transmit multicast data are provided in a disclosed embodiment, where the MGC sends a multicast-related indication to the MG. Afterward, the MG acts as a multicast source to transmit the corresponding service data to the users in the network at the receiver side in the form of multicast according to the indication of the MGC. The indication includes several contents extended in a disclosed embodiment in order to enable the MG to transmit multicast data.

The foregoing two types of methods and systems may be combined to interconnect the multicast path between networks, thus meeting requirements of various applications more flexibly. Moreover, the MG device does not need to be updated in the disclosed embodiments.

DETAILED DESCRIPTION

In disclosed embodiments, a package is extended in the H.248 protocol to enable the MG to receive and transmit multicast data. For example, the package may be labeled "Multicast Indication Package"; packet ID: mip, (0x0001); version: 1. The multicast indication package may include, an indication signal and an event.

Figure 1:
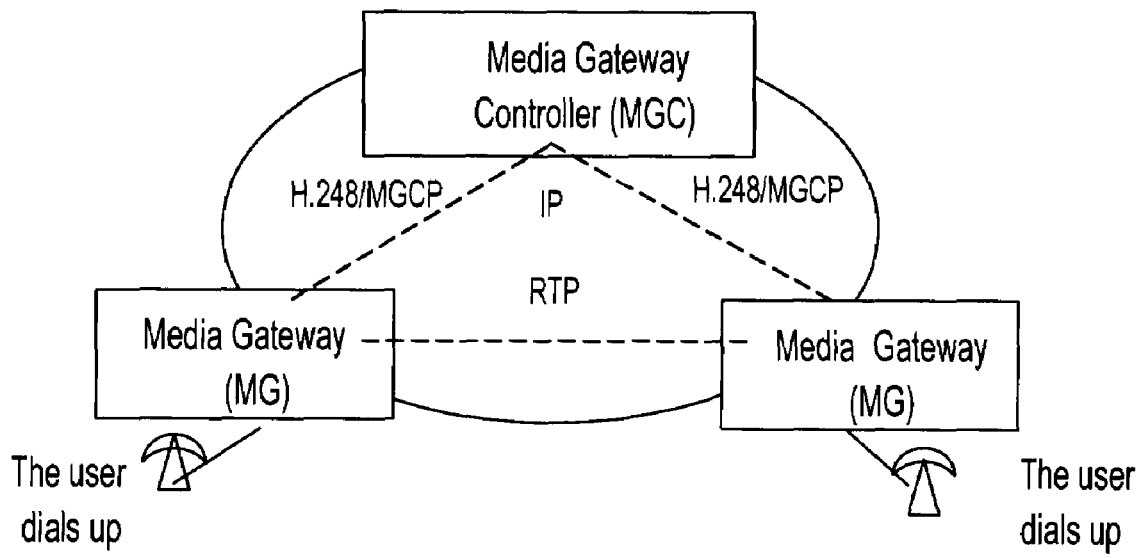
FIG. 1 shows an exemplary structure of a packet-switched network in the prior art.
Figure 2:
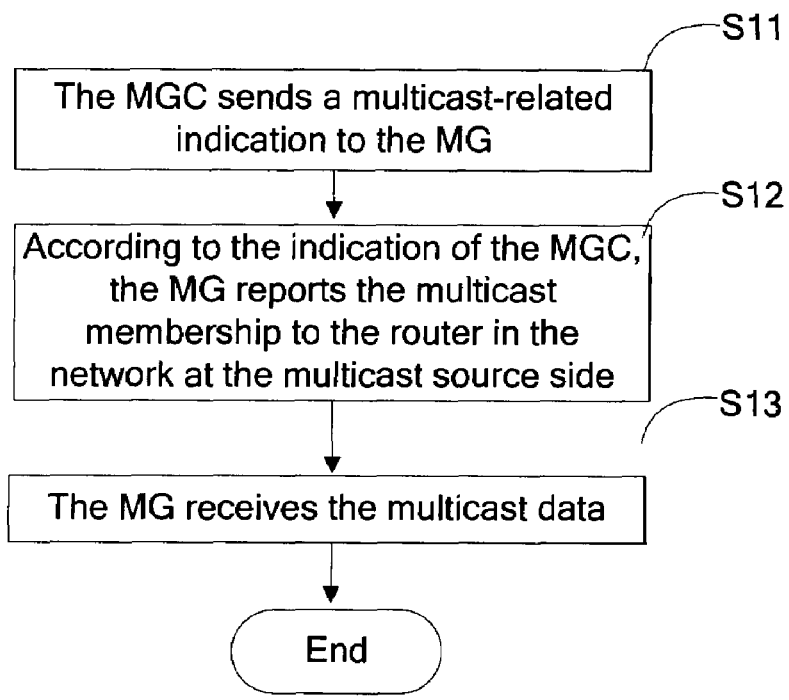
FIG. 2 is an exemplary flowchart of a method for an MG to receive multicast data according to disclosed embodiments.

In order for an MG to receive multicast data, a method for an MG to receive multicast data is provided in an embodiment. As shown in FIG. 2, the method may include the following steps:

S11: The MGC sends a multicast-related indication to the MG.

S12: According to the indication of the MGC, the MG reports the relevant information (for example, multicast membership) to the router in the network at the multicast source side, and requests to join the multicast group. The MG retrieves the user membership information from the indication sent by the MGC, processes the information, and reports the multicast membership to the router in the network at the multicast source side. After receiving the multicast membership, the network at the multicast source side adds the MG as a member of the multicast group, or modifies the membership information, and then sends multicast data to the MG.

S13: The MG receives the multicast data transmitted by the multicast source.

Furthermore, in order for the MG to be able to process the message of querying multicast memberships sent by the router, the disclosed embodiment defines query events and indication signals, as described below.

The query event is described below.

An event (named "Multicast Membership Querier", for example) may be defined. Through the event, the MG may report the receiving of the multicast membership query message to the MGC. After the MG receives a relevant multicast membership query message, the MG returns the multicast policy information stored locally in response to the multicast membership query message, where the multicast policy information stored locally may be the policy sent by the MGC previously. Alternatively, the MG requests relevant decisions from the MGC, and the MG reports the multicast query event message to the MGC through a Notify command. Meanwhile, additional parameter information (for example, protocol version supported by the router, querier robustness, query interval, multicast address and source address) is attached to the reported event.

Event name: Multicast Membership Querier; event ID: mmq, (0x0002); definition domain: this event may be sent by the MGC to the MG, or preset on the MG. The event is effective on the whole MG ROOT or certain terminals on the MG.

This event is sent from the MGC to the MG without carrying any parameter. The contents carried in the multicast query event message reported by the MG to the MGC include one of the following items:

(1) Querier's Protocol Version:

This parameter carries the version information of the multicast management protocol (for example, IGMP) run by the querier in the network, its valid values may include: 1, 2, and 3, and with a default value of 3. This parameter value depends on the received query message: if the length of the received IGMP query message is 8 bytes and its Max Resp Code is 0, the version is 1; if the length of the received IGMP query message is 8 bytes and its Max Resp Code is not 0, the version is 2; and if the length of the received IGMP query message is greater than or equal to 12 bytes, the version is 3.

(2) Querier's Robustness Variable: This parameter carries the robustness variable value of the querier, and indicates the count of the querier sending query messages, with a view to adjusting the expected packet loss ratio in the network.

Neither 0 nor 1 is allowed as a value of this parameter. The default value of this parameter is 2.

(3) Querier's Query Interval Code: This parameter carries the value of the interval of the querier sending query messages. The default value of this parameter is 125 seconds.

(4) Query Number of Sources: This parameter carries the number of the specified source addresses in the query message. In the case of universal query and specific group query, the value of this parameter is 0.

(5) Query Source Address: This parameter carries a list of source addresses specified in the query message, where the number of the specified source addresses is the same as that of the "Query Number of Sources" mentioned above.

(6) Query Group Address: This parameter carries the multicast group address specified in the query message. In the case of universal query, this parameter is null, and in the case of querying membership of a specific multicast group, this parameter carries the specified multicast address.

Figure 3:
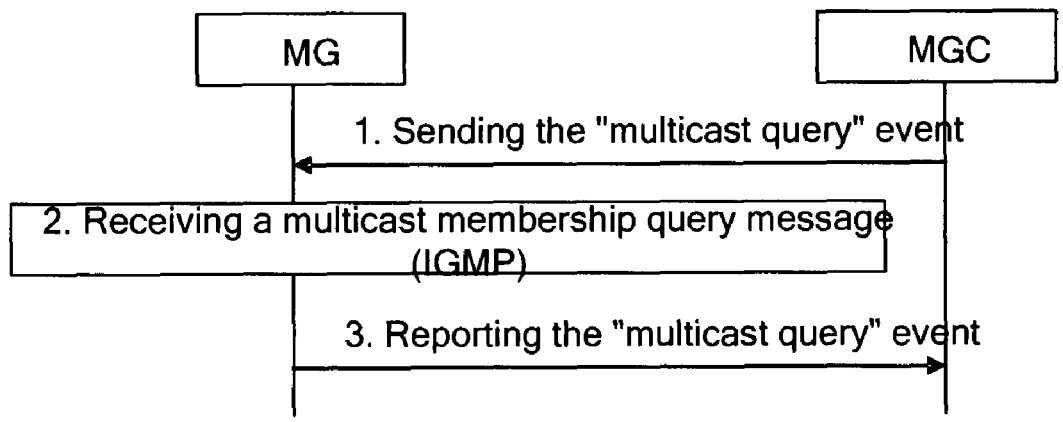
FIG. 3 shows an exemplary process of implementing multicast query events based on the H.248 protocol according to disclosed embodiments.

FIG. 3 shows the process of implementing a multicast query event based on the H.248 protocol (the command request and the response mechanism of the H.248 protocol are omitted in FIG. 3). The process includes the following steps:

Message 1: The MGC sends an "IGMP query event" to the MG, without carrying any parameter. This event may be carried in an Add or Modify command to the whole MG (ROOT) when the MG creates a terminal, or sent to an existing terminal.

Message 2: The MG receives the query message of the multicast router.

Message 3: The MG obtains the relevant multicast query message according to the received query message, and reports such information to the MGC through the "IGMP query request" event (for example, Notify command) sent by the MGC in message 1.

The indication signal is described below.

When the MGC receives the request message of the user joining or quitting the specific multicast group, the MGC sends a multicast-relevant indication to the MG.

Signal name: Multicast Group Membership; signal ID: mgm, (0x0003); description: This signal is used for the MGC to send the relevant multicast group membership information to the MG. It may be complete multicast group membership information of the user, or supplemental membership information, or a modification to the current multicast group membership. Definition domain: This event may be effective on the whole MG ROOT or certain terminals on the MG.

The contents carried by the indication signal include at least one of the following items:

(1) Multicast Address: This parameter carries the address of the multicast group that the user wishes to join. The format of the parameter is a type-D address, and its value range is 224.0.0.0-239.255.255.255.

(2) Record Type: This parameter indicates the type of the record, and may have one of the following values depending on the specific situation:

The record of the complete subscription state of the user—Current-State Record may arise in at least two circumstances:

i. MODE_IS_INCLUDE: For the specified multicast address, the filtering mode is INCLUDE; and the subsequent Source Address parameter includes a list of the corresponding source addresses. INCLUDE indicates receiving of only the data sent from the specified source address.

ii. MODE_IS_EXCLUDE: For the specified multicast address, the filtering mode is EXCLUDE; and the subsequent Source Address parameter includes a list of the corresponding source addresses. EXCLUDE indicates receiving of only the data sent from all addresses except the specified source address.

For a specified multicast address, when the filtering mode changes, the sent message is Filter-Mode-Change Record, which also may arise in at least two circumstances:

iii. CHANGE_TO_INCLUDE_MODE: For the specified multicast address, the filtering mode changes to INCLUDE; and the subsequent Source Address parameter includes a new list of source addresses.

iv. CHANGE_TO_EXCLUDE_MODE: For the specified multicast address, the filtering mode changes to EXCLUDE; and the subsequent Source Address parameter includes a new list of source addresses.

For a specified multicast address, when the source address changes (namely, differs from the current filtering mode), the sent message is a Source-List-Change Record, which also may arise in at least two circumstances:

v. ALLOW_NEW_SOURCES: For a specified multicast address, the Source Address parameter includes the source addresses expected by the user to receive. If this change occurs on the source list of an INCLUDE mode, the addresses in the Source Address are added into the existing list; if the change occurs on the source list of the EXCLUDE mode, the addresses in the Source Address are deleted from the existing list.

vi. BLOCK_OLD_SOURCES: For a specified multicast address, the Source Address parameter includes the source addresses not expected by the user to receive. If this change occurs on the source list of an INCLUDE mode, the addresses in the Source Address are deleted from the existing list. If the change occurs on the source list of the EXCLUDE mode, the addresses in the Source Address are added into the existing list.

(3) Number of Sources: This parameter carries the number of the specified source addresses in the report message.

(4) Source Address: This parameter may be in the form of a list, and carries 0-N IP unicast addresses (N is consistent with the number of sources). This parameter may be used together with the filtering mode to indicate whether the user expects or does not expect to receive the multicast data sent from the specific source address. If the report message corresponds to a report or response of IGMP V3, this parameter is carried. If it corresponds to IGMP V1 or V2, this parameter may be excluded.

(5) Send Delay: This parameter carries the maximum delay of the MG sending a report message. The MGC selects a delay time randomly between 0 and the maximum value according to the allowed maximum delay information, and the delay time is carried in the Send Delay parameter and sent to the MG. The MG sends a report message once the delay exceeds the time specified in this parameter. When the user sends a membership to join or quit a multicast group proactively, this parameter may be set to 0. Namely, the report message may be sent immediately after the MG receives the parameter information. The default value of this parameter is 10 seconds.

(6) Whether Stop Sending Membership Report: The MG sends a report to the multicast address readily to be reported. If the MG receives a report message of other host memberships, this parameter decides whether to stop the delay counter without sending any report message.

This parameter may be of the Boolean type, and possible values may include, but are not limited to:

(i) ON (enabling this function, namely, once receiving a report message of other memberships, stopping the delay counter without sending any report message);

(ii) OFF (disabling the function, without handling other membership reports received).

The default value of this parameter is ON. In IGMP V3, the host is unable to receive the report message from other hosts, and this parameter is meaningless. The IGMP V3 does not support this function.

(7) Automatic Reply Membership Query: This parameter decides whether to report the request-related policy to the MGC after the MG receives the IGMP query message from the router. That is, after receiving the IGMP query message, the MG may report to the MGC and request the relevant multicast relation information to send the response message, or send a response message proactively according to the multicast-related information stored on the MG without reporting to the MGC.

This parameter is of the Boolean type, and possible values are:

(i) ON (enabling this function, namely, once receiving a membership query message from the MGC, the MG sends a response message proactively according to the stored information);

(ii) OFF (disabling this function, namely, after receiving a query message, the MG reports to the MGC and requests the relevant multicast policy information).

The default value of this parameter is ON.

(8) Indication Triggering Reason: This parameter carries the reasons for sending the indication, including but not limited to: the indication triggered by receiving of the query event reported by the MG, and the indication sent proactively after the user subscription state changes.

(9) Purpose of Indication: This parameter includes but is not limited to, the indication on the previous state of the user, the indication on the current state, or the indication on only the state change part of the user.

Another parameter indicative of robustness variable of the report message may exist. Through this parameter, the MGC indicates the times of the MGC sending the report messages in order to control the reliability of message transmission. This parameter may be sent by the MGC to the MG, or preset on the MG.

The MGC sends a membership indication to the MG in two modes.

When the multicast membership of the user changes, the MGC sends membership information to the MG proactively, and the MG may send the information about the multicast membership change to the multicast router.

The first mode is as follows:

the MGC sends the current complete state information of the user to the MG; and the MG compares the current state information of the user with the previous state information to obtain the changed membership information, and sends the change information to the multicast router.

The second mode is as follows:

the MGC sends only the membership change information of the user to the MG, and the MG may send such information to the multicast router directly; and the foregoing two modes are based on the assumption that the MG retains the previous membership information of the user. If the MG does not retain such information, the MGC may send the old state information to the MG.

When receiving the query event reported by the MG, the MGC indicates the membership state information of the user to the MG The MG may send the current membership information of the user to the multicast router.

The first mode is as follows:

the MGC sends the current complete state information of the user to the MG; and the MG may send such information to the multicast router directly.

The second mode is as follows:

the MGC sends only the membership information change of the user to the MG, and the MG combines the user state change information with the previous state information to obtain the current complete membership information of the user, and then sends such information to the multicast router.

Likewise, the foregoing two modes are based on the assumption that the MG retains the previous membership information of the user. If the MG does not retain such information, the MGC may send the old state information to the MG.

The process related to the indication signal is illustrated below.

Figure 4:
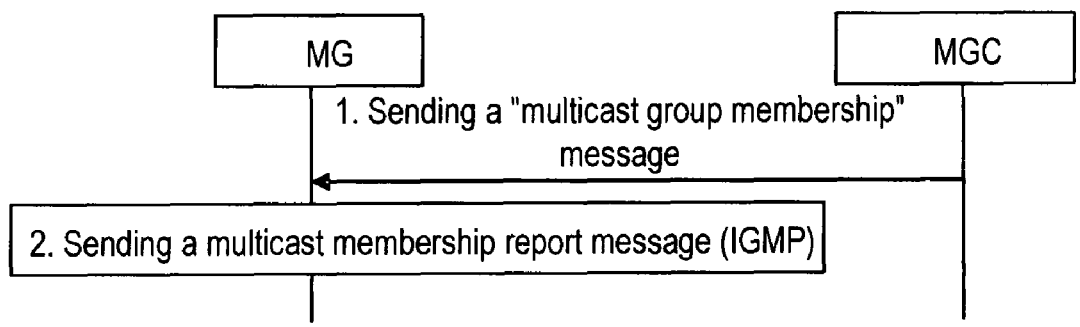
FIG. 4 shows an exemplary process of an H.248 user reporting multicast memberships proactively according to disclosed embodiments.

1) FIG. 4 shows a process where an H.248 user reports the multicast membership proactively (the command request and the response mechanism of the H.248 protocol are omitted in FIG. 4). The process includes the following steps:

Message 1: When the H.248 user wants to join a multicast group proactively, the MGC sends the multicast group membership signal to the MG, with the relevant multicast parameter information carried in the signal. The multicast group membership may be sent to the whole MG (ROOT) through an Add or Modify command, or sent to an existing terminal.

Message 2: According to the multicast group membership information obtained from the MGC, the MG sends an IGMP message to the multicast router proactively to report its membership.

If the existing multicast membership should be modified, the process is similar.

2) When the H.248 user wants to quit a multicast group, the MGC analyzes the version information of the current querier. If the version is 1, no report message is sent. If the version is not 1, the MGC sends the filtering information of the multicast address and the relevant source address to the MG, where the filtering mode is set to INCLUDE, the source address list is empty, and the delay counter is 0. The filtering information of the multicast address and the relevant source address may also be preset on the MG (where the filtering mode is set to INCLUDE, the source address list is empty, and the delay counter is 0). That is, if the version is not 1, the MG sends a quit report message to the adjacent router proactively to quit a multicast group.

Figure 5:
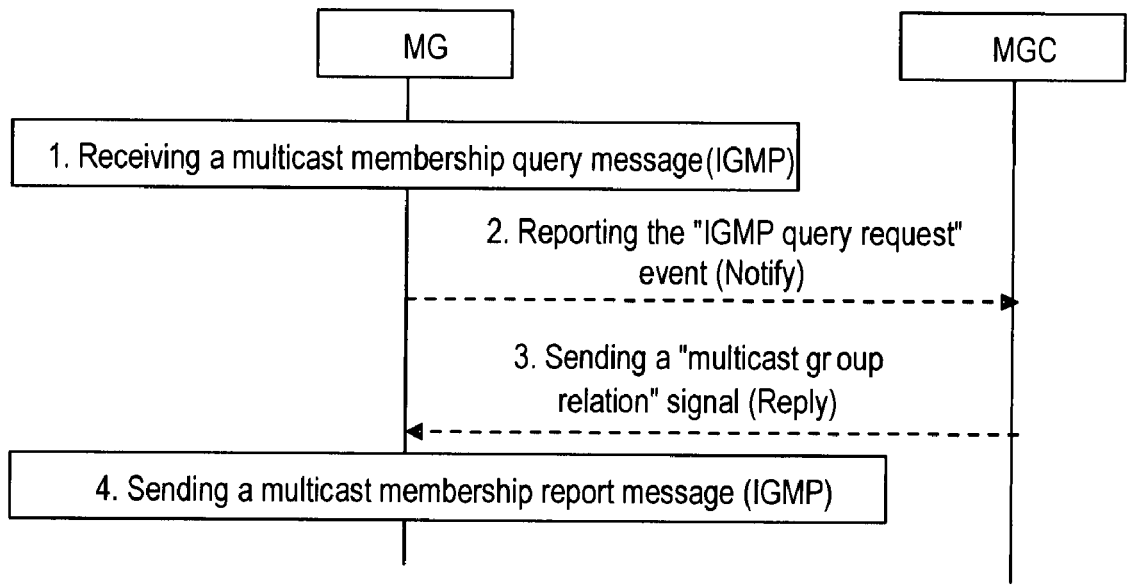
FIG. 5 shows an exemplary process for an MG to receive a query message and report the query result according to disclosed embodiments.

3) FIG. 5 shows a process where the MG receives a query message and reports the message (the command request and the response mechanism of the H.248 protocol are omitted in FIG. 5). The process includes the following steps:

Message 1: The MG receives the multicast membership query message from the multicast router.

Message 2: The MG obtains the relevant multicast query message according to the received query message, and reports such information to the MGC through a Notify command.

Message 3: The MGC sends a Reply carrying the corresponding multicast membership information to the MG according to the relevant multicast information.

Message 4: According to the multicast group membership information obtained from the MGC, the MG sends an IGMP message to the multicast router proactively to report its membership.

The reporting action in message 2 is optional. That is, if the parameter (7) "Automatic Reply Membership Query" is set in the signal previously sent by the MGC, after receiving the IGMP query message of the router, the MG may report to the MGC and request the relevant multicast relation information to send the response message, or send a response message proactively according to the multicast-related information stored in the MG without reporting to the MGC. Accordingly, message 3 is optional.

Figure 6:
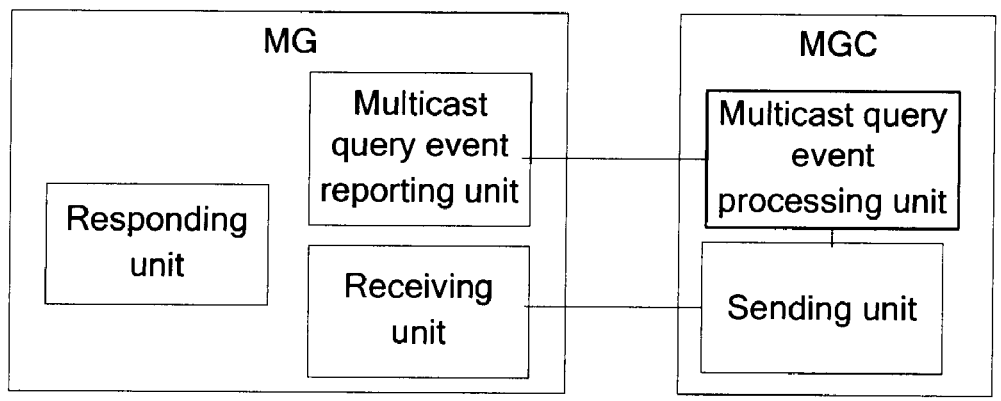
FIG. 6 shows an exemplary structure of a system for an MG to receive multicast data according to disclosed embodiment.

An embodiment provides a system for an MG to receive multicast data, and provides specific devices in such a system. As shown in FIG. 6, the system includes: an interconnected MGC (namely, the MGC corresponding to the system for an MG to receive multicast data herein), and an MG (namely, the MG corresponding to the system for an MG to receive multicast data herein). The MG includes: a receiving unit, a multicast query event reporting unit and a responding unit.

The receiving unit is adapted to report relevant information (for example, multicast membership) to the router in the network at the multicast source side according to the indication of the MGC, request to join the multicast group, and receive the multicast data.

The multicast query event reporting unit is adapted to report the multicast query event message to the MGC, after the MG receives a multicast membership query message from the router in the network at the multicast source side.

The responding unit is adapted to send a membership report message to the query router by using the current multicast policy information.

The MGC includes a sending unit and a multicast query event processing unit.

The sending unit is adapted to send a multicast-related indication to the MG when receiving a request of joining or quitting the multicast group from the user.

The multicast query event processing unit is adapted to retrieve the multicast-related information in the network adjacent to the network of the user from the message, and send multicast policy information to the MG accordingly, after receiving a multicast query event message.

Figure 7:
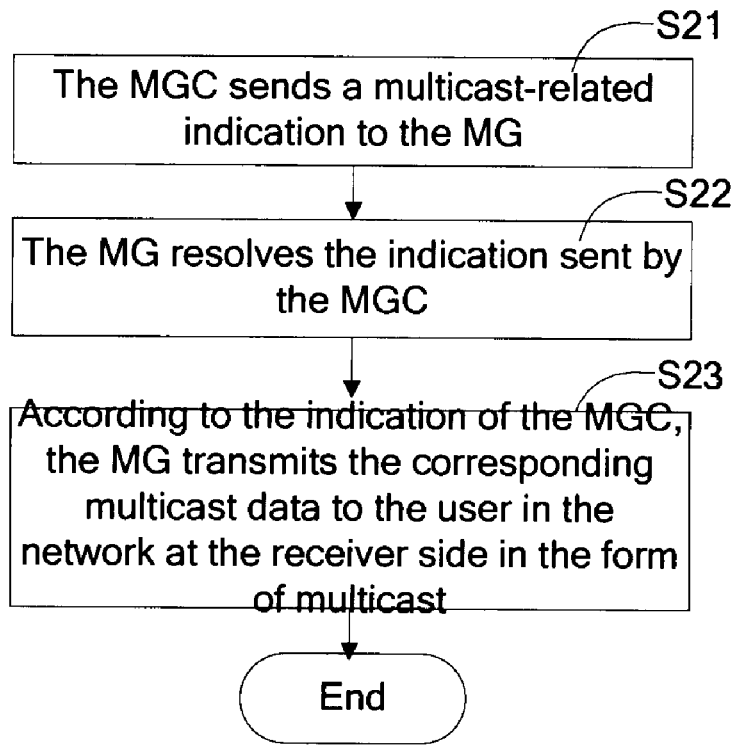
FIG. 7 shows an exemplary flowchart of a method for an MG to transmit multicast data according to disclosed embodiments.

In order for the MG to transmit the specified multicast data in the form of multicast, a method for an MG to transmit multicast data is provided in an embodiment. By extending the H.248 protocol, the MGC sends the relevant policy information to the MG. Therefore, the MG may act as a multicast source to send data to a specified multicast address. On the one hand, the MG may forward the multicast data received from another multicast address, thus supporting interconnection of the multicast path. On the other hand, the MG may transmit the data on the specified path. As shown in FIG. 7, the process includes the following steps:

S21: The MGC sends a multicast-related indication to the MG.

An indication signal is extended in the foregoing multicast indication package, for example, a signal named "Multicast Transmit Request". Through the indication signal, the MGC instructs the MG to act as a multicast transmitting source to play the media data on the specified path, or use the media stream received by the MG as a multicast medium for transmitting.

Signal name: Multicast Transmit Request; signal ID: mtr, (0x0004); description: This signal is used for the MGC to send the relevant multicast service transmitting information to the MG Definition domain: This event may be effective on certain terminals on the MG This signal may be sent by the MGC to the MG, or preset on the MG. This signal may be carried in the Add command to the terminal when the MG creates a terminal, or sent to an existing terminal through a Modify command.

The Multicast Transmit Request carries the source of the played media stream. The source of the media stream may be media received by other terminals in the MG (for example, multicast service, for the purpose of implementing service routing and forwarding), or the media whose address and source are specified separately and used as a multicast data source for transmitting. The Multicast Transmit Request may also carry the multicast address of the multicast data sent by the MG. Moreover, the MG may allocate an address for sending service streams. For example, the MG may send the multicast service stream by using the allocated address and port as the source address and port of the service stream, and use the multicast address as a destination address to transmit services. After finishing the foregoing operations, the MG may feedback the operation result to the MGC. The operation result carries the relevant information, for example, the allocated address and port for forwarding services.

The contents carried in the indication signal include at least one of the following items:

(1) MulticastAddr

This parameter includes the multicast address which may transmit multicast services. The format of the parameter is a type-D address, and its value range is 224.0.0.0-239.255.255.255.

(2) DataSourceInfo

This parameter includes the source information of the data to be transmitted in the multicast service. The source information may be the media received by other terminals in the MG, or the media whose address and source are specified separately (for example, URI format).

This parameter may also include port information of the multicast address.

S22: The MG resolves the indication sent by the MGC.

The MG resolves the indication sent by the MGC and obtains the multicast address and/or source information of the transmitted data.

S23: According to the indication of the MGC, the MG transmits the corresponding service data to the user in the network at the receiver side in the form of multicast.

The MG transmits the multicast address and/or the service data corresponding to source information of the transmitted data to the user in the network at the receiver side in the form of multicast.

Figure 8:
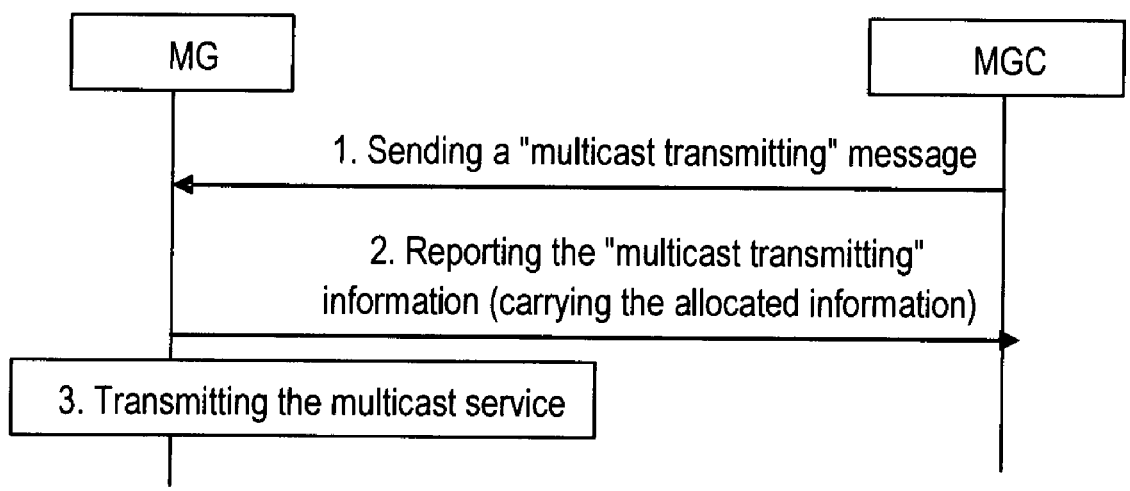
FIG. 8 shows an exemplary process of transmitting multicast data based on the H.248 protocol according to disclosed embodiments.

FIG. 8 shows the process of transmitting multicast data based on the H.248 protocol (the command request and the response mechanism of the H.248 protocol are omitted in FIG. 3). The process includes the following steps:

Message 1: The MGC sends a "multicast transmit" message to the MG, where the message carries the information such as the multicast address and the source of the transmitted data. This message may be carried in the Add command to the terminal when the MG creates a terminal, or sent to an existing terminal through a Modify command.

Message 2: The MG allocates the address and port for sending service streams, and reports them to the MGC through the corresponding Reply message.

This message is mandatory when the MGC requires the information about the multicast source address. If the IGMP version supported by the user side is lower than 3 or the user does not need to filter the multicast source, it is optional as to whether the address information allocated by the MG is reported to the MGC or not.

Message 3: The MG transmits multicast data to the specified multicast address.

Figure 9:
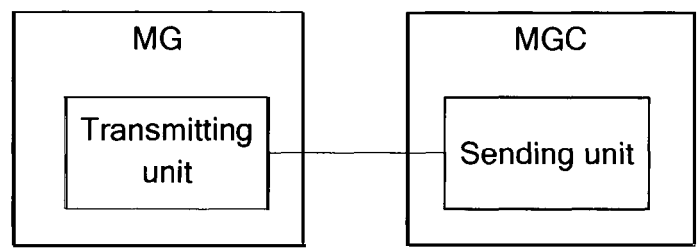
FIG. 9 shows an exemplary structure of a system for an MG to transmit multicast data according to disclosed embodiments.

An embodiment provides a system for an MG to transmit multicast data, and provides specific devices in such a system. As shown in FIG. 9, the system includes: an interconnected MGC (namely, the MGC corresponding to the system for an MG to transmit multicast data herein), and an MG (namely, the MG corresponding to the system for an MG to transmit multicast data herein). The MG includes a transmitting unit.

The transmitting unit is adapted to transmit the specified data to the user in the form of multicast according to the indication of the MGC.

The MGC includes a sending unit.

The sending unit is adapted to send an indication to the MG, indicating transmitting of data in the form of multicast. The indication carries: a multicast address, and/or source information of the multicast data.

Through the following instance, the method for an MG to receive multicast data and the method for an MG to transmit multicast data in an embodiment are described together.

Figure 10:
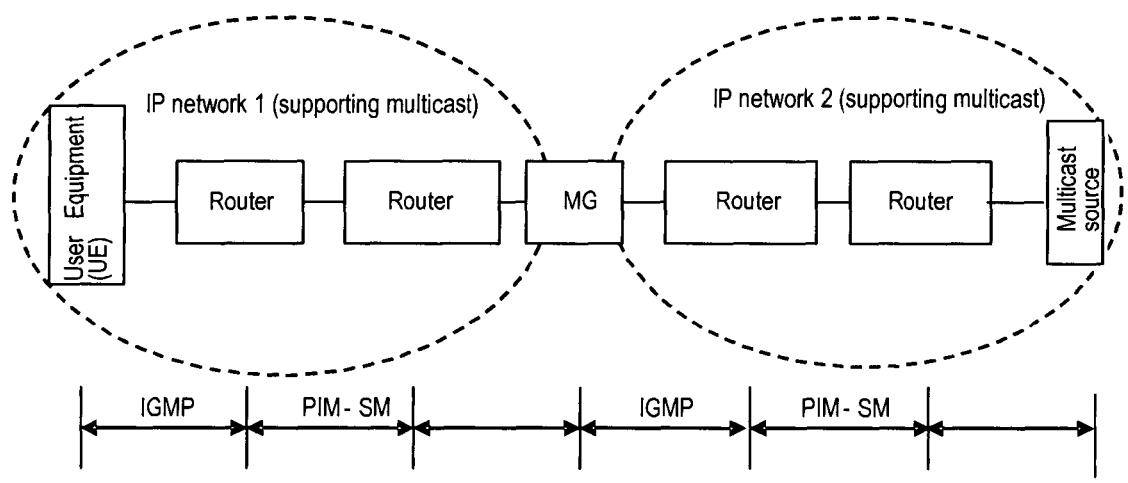
FIG. 10 shows an exemplary application scenario of a method instance according to disclosed embodiments.

FIG. 10 illustrates the application scenario of the disclosed embodiment. The multicast source and the multicast user are in two different IP networks, and the two networks are interconnected through an MG. After receiving an indication from the MGC, the MG sends an IGMP message to the adjacent router in network 2, and reports its multicast group membership, thus joining a multicast group in order to receive multicast data from the specified multicast source. Meanwhile, at the network 1 side, the MG acts as a multicast transmitting source to transmit the multicast data received at the network 2 side in the form of multicast. In this case, the user in network 1 may use the prior art to join the multicast group to which the MG transmits the multicast data, receive the multicast data, thus forwarding the multicast media and signaling. Likewise, this embodiment may also be suitable for the scenario with multiple networks interconnected through an MG. That is, each MG acts as a multicast user at the multicast source side for receiving multicast data. acts as a multicast transmitting source at the other side (multicast user side) of the network, and transmits the received data out in the form of multicast.

Figure 11:
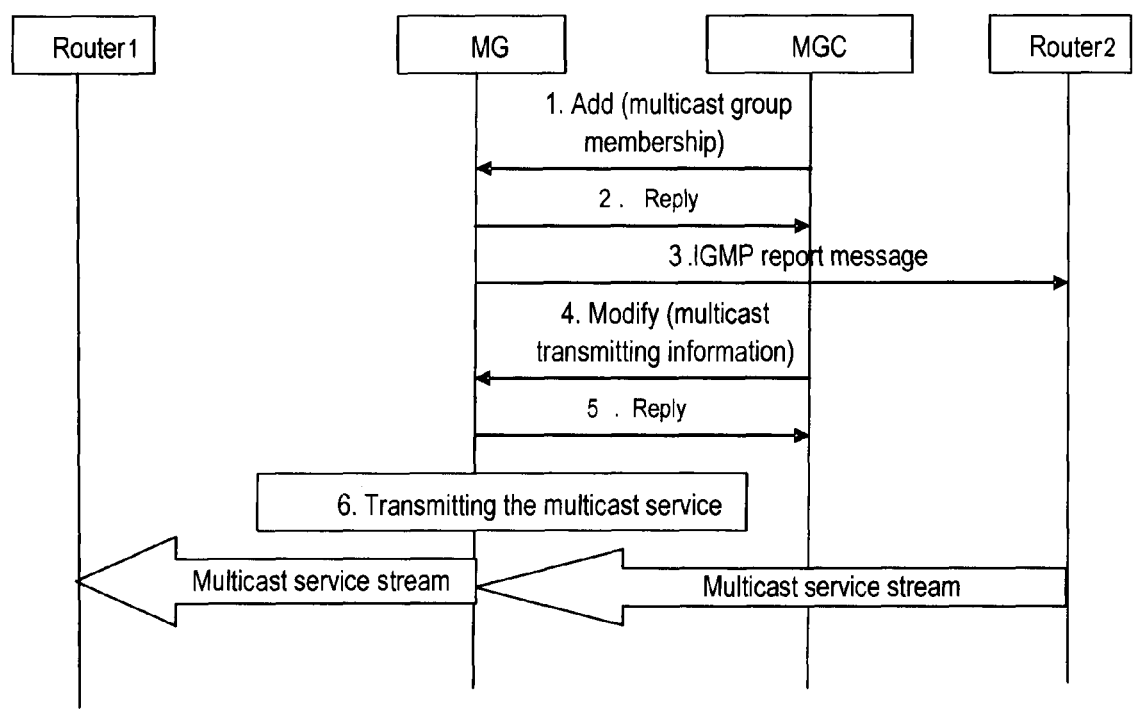
FIG. 11 shows an exemplary flowchart of a method instance according to disclosed embodiments.

As shown in FIG. 11, based on the application scenario shown in FIG. 10, Router 1 and Router 2 are distributed on two different IP networks, and the two networks are interconnected through an MG. FIG. 11 supposes that the multicast transmitting source is located in the network at the Router 2 side. It should be noted that FIG. 11 shows the process between entities correlated to the MG For brevity, FIG. 11 omits the operations and processes outside the two routers (including the process from the multicast source to Router 2 and the process between Router 1 and the multicast user of the network).

The process for an MG to forward multicast media and signaling includes the following steps:

Message 1: The MGC sends an Add command to the MG to create a terminal, in order to join a multicast group and receive multicast data. The Add command carries the relevant "Multicast Group Membership" information. Therefore, the MG may send an IGMP joining message to the adjacent router according to such information.

For an existing terminal, the relevant information may also be sent through the Modify command.

Message 2: The MG responds with a Reply message.

Message 3: According to the relevant multicast information received from the MGC, the MG sends an IGMP multicast membership message to the adjacent router, and joins a multicast group.

In this way, the MG may receive the multicast service data from the multicast group joined by the MG. The MG may also use the existing access control mechanism to receive only the data packets from the specified multicast source addresses and ports.

Message 4: The MGC instructs the MG to act as a multicast transmitting source to transmit the received multicast data to the user in another IP network in the form of multicast. The MGC sends a Modify command to the MG, where the command carries the information about the multicast transmitting, including the multicast address.

The MG may also act as a separate multicast transmitting source to transmit the data information of the specified address out. Besides, if the relevant information is not sent to the MG in the form of packages, the existing SDP parameters may be used instead to set the Remote address to a type-D multicast address, and the multicast data is transmitted to such a multicast address.

Message 5: The MG allocates the address and port for sending service streams, and reports them to the MGC through the corresponding Reply message.

Message 6: The MG transmits multicast services to the network.

Supplementary notes:

(1) The IGMP protocol is applicable to the IPv4 system. For an IPv6 system, the MLD protocol applies. The IPv6-based host uses an MLD message to report its multicast members, and the IPv6-based router uses an MLD query message to collect the multicast user information. This embodiment also provides support of the IPv6 system, namely, supports the MLD message in the same way as described above. The difference is that the corresponding multicast address parameter is a multicast address of the IPv6 format, and the multicast membership report and the query message are an MLD message.

(2) In the foregoing solution, the MGC sends a signal about the multicast group membership to the MGC where the signal carries a user operation for subscription information of a specific multicast address. In the IGMP, a report message may carry more than one record, and each record includes a user operation for subscription information of a specific multicast address. Therefore, in the solution provided above, if multiple operations for the user subscription relation may be provided, the operation is performed through multiple report messages.

Nevertheless, the parameters in the "Multicast Group Membership" signal may be modified so that one message carries report information of one or more multicast address membership records.

First, a parameter may be added, for example, a parameter named "Number of Group Records", to indicate the number of multicast address membership records carried in the signal. That is, each record is an entry of report information for a specific multicast address.

The subsequent modification comes in two modes:

(i) The type of the relevant parameters in the signal is modified, and the single-parameter form is modified to the one-dimension vector form. For example, the "Multicast Address" parameter is defined as the form of a one-dimension vector, and carries N multicast addresses (N is equal to the number of group records); the "Record Type" parameter is defined as the form of a one-dimension vector, and carries N record types (N is equal to the number of group records), where the sequence of the record types correspond to the sequence of foregoing multicast addresses uniquely; the "Number of Sources" parameter is defined as the form of a one-dimension vector, and carries N source addresses (N is equal to the number of group records), where the sequence of source addresses corresponds to the sequence of the foregoing multicast addresses uniquely. Likewise, the "Source Address" parameter is defined as the form of a one-dimension vector, and carries N source address lists (N is equal to the number of group records), where the sequence of source address lists corresponds to the sequence of the foregoing multicast addresses uniquely, and each source address list is a one-dimension vector and carries N source addresses (N is equal to the number of source addresses).

For example, the MGC may send these records to the MG: for the multicast address 224.65.10.150, new source addresses 202.113.0.180 and 202.113.0.181 are allowed, and old source addresses 201.0.0.100 and 201.0.0.101 are blocked; for the multicast address 224.65.0.100, it is changed to the inclusive mode to receive the multicast data from the source addresses 200.1.1.50, 200.1.1.51, and 200.1.1.52.

According to the method provided above, the record information may be sent to the MG in three attempts; according to the modification made here, the record information is sent to the MG in only one attempt. The format is as follows:

The value of the "Number of Group Records" parameter is 3.

The "Multicast Address" parameter carries (224.65.10.150, 224.65.10.150, 224.65.0.100);

The "Record Type" parameter carries (ALLOW_NEW_SOURCES, BLOCK_OLD_SOURCES, CHANGE_TO_INCLUDE_MODE).

The "Number of Sources" parameter carries (2, 2, 3).

The "Source Address" parameter carries ((202.113.0.180, 202.113.0.181), (201.0.0.100, 201.0.0.101), (200.1.1.50, 200.1.1.51, 200.1.1.52)).

The foregoing example omits other parameters possibly carried in the signal.

(ii) The parameters (1)-(4) in the existing signal are deleted, and a new parameter is defined in the signal. For example, the new parameter may be "Group Record" for defining report information of the user subscription relation. This parameter further carries several relevant parameters, including: Multicast Address, Record Type, Number of Sources, and Source Address. The meanings and types of such parameters are the same as the initial definition of this embodiment. The sequence of such parameters may be specified by the MGC, or the MGC indicates the sequence to the MG beforehand.

The "Group Record" parameter may be defined as the form of a one-dimension vector, or the form of a list. Each signal carries N Group Records (N is equal to the number of group records).

For example, the MGC may send these records to the MG: for the multicast address 224.65.10.150, new source addresses 202.113.0.180 and 202.113.0.181 are allowed, and old source addresses 201.0.0.100 and 201.0.0.101 are blocked; for the multicast address 224.65.0.100, it is changed to the inclusive mode to receive the multicast data from the source addresses 200.1.1.50, 200.1.1.51, and 200.1.1.52.

According to the method provided above, the record information may be sent to the MG in only one attempt rather than three attempts. The format is as follows:

The value of the "Number of Group Records" parameter is 3.

The "Group Record" parameter carries ((224.65.10.150, ALLOW_NEW_SOURCES, 2, (202.113.0.180, 202.113.0.181)), (224.65.10.150, BLOCK_OLD_SOURCES, 2, (201.0.0.100, 201.0.0.101)), (224.65.0.100, CHANGE_TO_INCLUDE_MODE, 3, (200.1.1.50, 200.1.1.51, 200.1.1.52))) if it is in the form of a one-dimension vector.

The foregoing example omits other parameters possibly carried in the signal.

(3) The foregoing solution is about the scenario with only one multicast source. If there is more than one multicast source, the relevant support may also be provided.

For example, if multiple multicast sources exist, the MGC may instruct the MG to create a context for each multicast source according to the method in this embodiment. Each context transmits the multicast data received from a specific multicast source in the form of multicast, thus supporting multiple multicast sources. In this case, only one context is created, and the context includes multiple terminals. The multicast media and signaling are forwarded through the internal topology relation of the context.

(4) In this embodiment, the H.248 protocol is applied. Other media gateway control protocols such as MGCP are theoretically similar. This embodiment also supports other media gateway control protocols.

(5) In the method for forwarding multicast media and signaling provided above, the MG transmits the received multicast data out in the form of multicast. Here the MG may also join the multicast group as a multicast user, and receive the multicast data. At the other side, the MG may also forward the received data out in the form of unicast.

(6) In the foregoing example, the MGC sends the indication of the MG through the signals in the H.248. Here the indication of the MG may be sent in other modes based on the H.248, including but not limited to, the indication of the MG is sent through events, through attributes, or through extending the SDP.

The application scenarios of this embodiment include but are not limited to the following:

(1) According to the multicast membership information and the relevant indication received from the MGC, the MG sends an IGMP message to the adjacent router to join a multicast group. Therefore, as a multicast user, the MG may receive the multicast service from the relevant multicast group.

(2) The MG may transmit the received multicast service out in the form of multicast according to the information (such as multicast address) indicated by the MGC.

(3) For the received multicast service, the MG may forward the received data out in the form of unicast, which is already supported by the H.248 protocol.

(4) According to the indication information of the MGC, the MG may act as a multicast transmitting source to transmit the data of the specified address out in the form of multicast.

In the final analysis, a method for an MG to receive multicast data is provided in an embodiment, where the MGC sends a multicast-related indication to the MG. Afterward, the MG reports multicast memberships to the router in the network at the multicast source side according to the indication of the MGC. Therefore, the MG joins or quits the multicast group as a user, and receives multicast data. The indication includes several contents extended in an embodiment in order to enable the MG to receive multicast data.

Accordingly, a system for an MG to receive multicast data is provided in an embodiment.

Accordingly, an MG and an MGC are provided in an embodiment.

A method for an MG to transmit multicast data is provided in an embodiment, where the MGC sends a multicast-related indication to the MG. Afterward, the MG acts as a multicast source to transmit the corresponding service data to the users in the network at the receiver side in the form of multicast according to the indication of the MGC. The indication includes several contents extended in an embodiment in order to enable the MG to transmit multicast data.

Corresponding to the method for an MG to transmit multicast data, a system for an MG to transmit multicast data is provided in an embodiment.

The foregoing two types of methods and systems may be combined to interconnect the multicast path between networks, thus meeting requirements of various applications more flexibly. Moreover, the MG device does not need to be updated in the embodiment.

Although the invention has been described through some exemplary embodiments, the invention is not limited to such embodiments. It is apparent that those skilled in the art can make various modifications and variations to the present invention without departing from the spirit and scope of the present invention. The present invention is intended to cover these modifications and variations provided that they fall in the scope of protection defined by the claims or their equivalents.

What is claimed is:

1. A method for a Media Gateway (MG) to receive multicast data, comprising:
   receiving a multicast-related indication signal from a Media Gateway Controller (MGC), the multicast-related indication signal comprising multicast group membership information of a user, the multicast group membership information comprising an address of a multicast group;
   reporting the multicast group membership information to a router in a network at a multicast source side and requesting to join the multicast group; and
   receiving the multicast data of the multicast group from the multicast source side after the MG is added as a member of the multicast group,
   wherein the multicast-related indication signal sent by the MGC is in response to a request by the user to join the multicast group, and
   wherein the multicast-related indication signal is included in a package extended in H.248 protocol;
   wherein the method further comprises:
   receiving a multicast membership query message from the router in the network at the multicast source side;
   reporting a query in a multicast query event message to the MGC;
   receiving complete multicast group membership information of the user or a modification part of the multicast group membership information of the user from the MGC in response to the multicast query event message; and
   returning the complete multicast group membership information of the user or the modification part of the multicast group membership information of the user to the router as current multicast policy information in response to the multicast membership query message.

2. The method of claim 1, wherein the multicast query event is preset on the MG or is sent by the MGC to the MG.

3. The method of claim 1, further comprising:
   receiving complete multicast group membership information of the user or a modification part of the multicast group membership information of the user from the MGC when the multicast group membership of the user changes; and
   reporting the modification part of the multicast group membership information of the user to the router in the network at the multicast source side.

4. The method of claim 3, further comprising:
   modifying, by the network at the multicast source side, the multicast membership.

5. The method of claim 1, wherein the multicast group membership information sent from the MGC to the MG further comprises at least one of the following items:
   a Record Type item, comprising a complete subscription state of the user, a modification of a filtering mode, or a modification of a source address;
   a Number of Sources item, indicating a number of the source address;
   a Source Address item;
   a Send Delay item, indicating a maximum delay of the MG sending a report message;
   a Whether Stop Sending Membership Report item, indicating whether to stop a delay counter without sending any report message, if the MG receives a report message with the same multicast address sent from other hosts when the MG waits for sending a report message;
   an Automatic Reply Membership Query item, indicating whether to allow the MG to reply a multicast membership query message automatically;
   an Indication Triggering Reason item, triggered by receiving of a query event reported by the MG, or sent proactively after a user subscription state changes; and
   a Purpose of Indication item, indicating a previous state of the user, a current state of the user, or a state change part of the user.

6. The method of claim 1, wherein the multicast-related indication signal further comprises a multicast transmit request, and the multicast transmit request carries a multicast address as a destination address to transmit the multicast data; and wherein the method further comprises:
   transmitting the multicast data to the user in the network at a receiver side in the form of multicast according to the multicast address.

7. The method of claim 6, wherein the multicast-related indication signal further comprises source information of the transmitted multicast data.

8. The method of claim 6, further comprising:
   allocating an address and a port for sending the multicast data after the multicast-related indication signal is received; and
   transmitting the multicast data to the multicast address in the form of multicast through the address and the port.

9. A system for receiving multicast data, comprising:
   a Media Gateway Controller (MGC) and a Media Gateway (MG), wherein the MGC is configured to send a multicast-related indication signal to the MG in response to a request for joining a multicast group from a user;
   wherein the MG comprises a receiving unit and a reporting unit, the receiving unit being configured to receive the multicast-related indication signal from the MGC, the multicast-related indication signal comprising multicast group membership information of the user, the multicast group membership information comprising an address of the multicast group; the reporting unit being configured to report the multicast group membership information to a router in a network at a multicast source side, and request to join the multicast group; and the receiving unit being further configured to receive the multicast data transmitted by the multicast source side after the MG is added as a member of the multicast group; and
wherein the multicast-related indication signal is included in a package extended in H.248 protocol;
wherein:
the receiving unit of the MG is further configured to receive a multicast membership query message from the router in the network at the multicast source side;
the reporting unit of the MG is further configured to report the query in a multicast query event message to the MGC;
the MGC is further configured to send complete multicast group membership information of the user or a modification part of the multicast group membership information of the user in response to the multicast query event message; and
the MG is further configured to send the complete multicast group membership information of the user or the modification part of the multicast group membership information of the user indicated by the MGC to the router as current multicast policy information.

10. The system of claim 9, wherein
the multicast-related indication signal further comprises a multicast transmit request, and the multicast transmit request carries a multicast address as a destination address to transmit the multicast data; and
the reporting unit is further configured to transmit the multicast data to the user in the network at a receiver side in the form of multicast according to the multicast address.

11. The system of claim 10, wherein the multicast-related indication signal further comprises source information of the multicast data.

12. A Media Gateway (MG) for receiving multicast data, comprising:
a receiving unit, configured to receive a multicast-related indication signal from a Media Gateway Controller (MGC), the multicast-related indication signal comprising multicast group membership information of a user, the multicast group membership information comprising an address of a multicast group; and
a reporting unit, configured to report the multicast group membership information to a router in a network at a multicast source side, and request to join the multicast group,
wherein the receiving unit is further configured to receive the multicast data of the multicast group from the multicast source side after the MG is added as a member of the multicast group,
wherein the multicast-related indication signal sent by the MGC is in response to a request by the user to join the multicast group, and
wherein the multicast-related indication signal is included in a package extended in H.248 protocol;
wherein:
the receiving unit is further configured to receive a multicast membership query message from the router in the network at the multicast source side;
the reporting unit is further configured to report a query in a multicast query event message to the MGC;
the receiving unit is further configured to receive complete multicast group membership information of the user or a modification part of the multicast group membership information of the user from the MGC in response to the multicast query event message; and
the reporting unit is further configured to return the complete multicast group membership information of the user or the modification part of the multicast group membership information of the user to the router as current multicast policy information in response to the multicast membership query message.

13. The MG of claim 12, wherein the multicast-related indication signal further comprises a multicast transmit request, and the multicast transmit request carries a multicast address as a destination address to transmit the multicast data; and
wherein the reporting unit is further configured to transmit the multicast data to the user in the network at a receiver side in the form of multicast according to the multicast address.

* * * * *